United States Patent [19]

Amiet et al.

[11] Patent Number: 5,619,547

[45] Date of Patent: Apr. 8, 1997

[54] DEVICE FOR GUIDING A FUEL ASSEMBLY DURING LOADING

[75] Inventors: Pierre Amiet, Condrieu; Michel Brin, Bourgoin Jallieu, both of France

[73] Assignees: Framatome, Courbevoie; Compagnie Generale des Matières Nucléaires, Velizy Villacoublay, both of France

[21] Appl. No.: 530,123

[22] PCT Filed: Feb. 20, 1995

[86] PCT No.: PCT/FR95/00193

§ 371 Date: Oct. 12, 1995

§ 102(e) Date: Oct. 12, 1995

[87] PCT Pub. No.: WO95/23414

PCT Pub. Date: Aug. 31, 1995

[30] Foreign Application Priority Data

Feb. 23, 1994 [FR] France ................................. 94 02054

[51] Int. Cl.$^6$ ................................................ G21C 19/20
[52] U.S. Cl. ............................................ 376/261; 376/264
[58] Field of Search ................................. 376/261, 264

[56] References Cited

U.S. PATENT DOCUMENTS

| 3,253,995 | 5/1966 | Antonsen et al. ............ 376/271 |
|---|---|---|
| 4,676,945 | 6/1987 | Barkhurst ........................ 376/261 |
| 4,788,028 | 11/1988 | Leclerco et al. ............... 376/264 |

FOREIGN PATENT DOCUMENTS

| 0220117 | 4/1987 | European Pat. Off. . |  |
|---|---|---|---|
| 2614128 | 10/1988 | France ............................ 376/261 |
| 2652942 | 4/1991 | France ............................ 376/261 |
| 1464967 | 8/1970 | Germany . |  |

Primary Examiner—Daniel D. Wasil
Attorney, Agent, or Firm—Pollock, Vande Sande & Priddy

[57] ABSTRACT

The guiding device comprises a body, the size of which corresponds to that of a fuel assembly, intended to rest on the lower core plate (20), equipped with holding means intended to be grasped by an assembly-handling machine, extended downwards by means (18) for positioning it on the lower core plate at an assembly location adjacent to the one intended to receive the assembly to be guided, and two wings (30) carried by the bottom part of the body, forming an angle of 90° in a horizontal plane, each one having an inclined guide face (32) ending at the bottom above the location intended to receive the assembly when the device is in place. Each wing (30) can be retracted, starting from a deployed state, towards a position in which it is withdrawn within the horizontal size of the body.

10 Claims, 4 Drawing Sheets

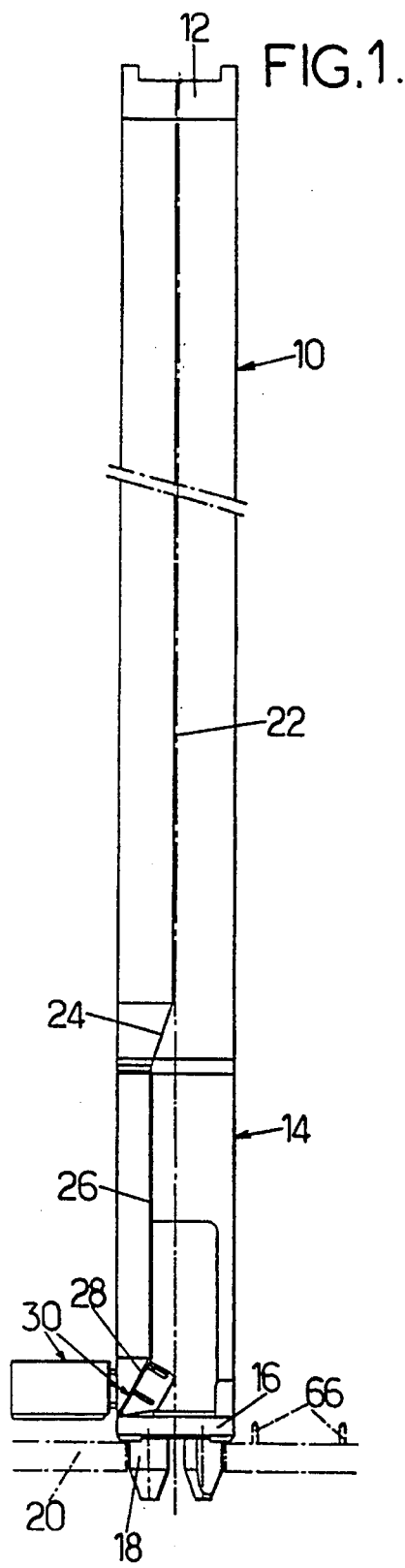
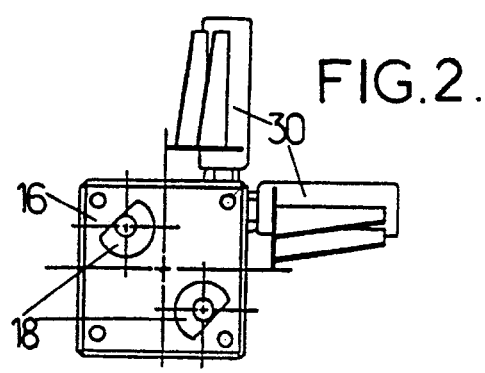
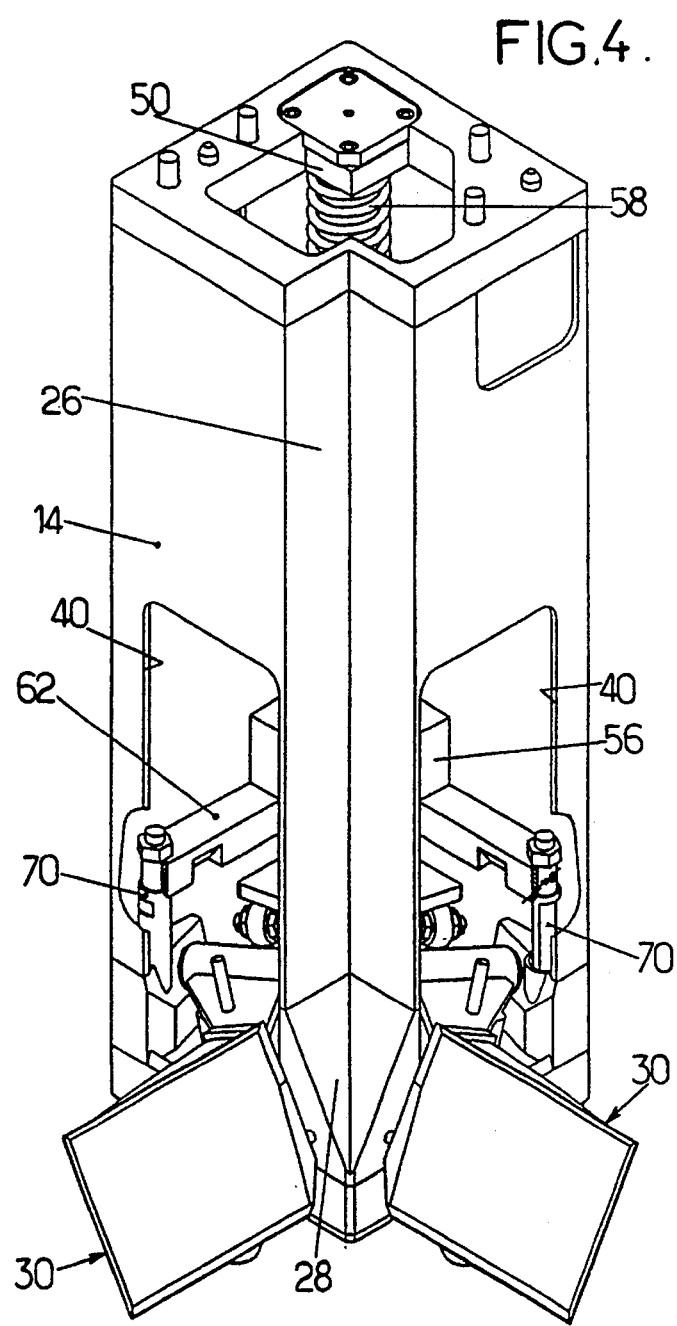

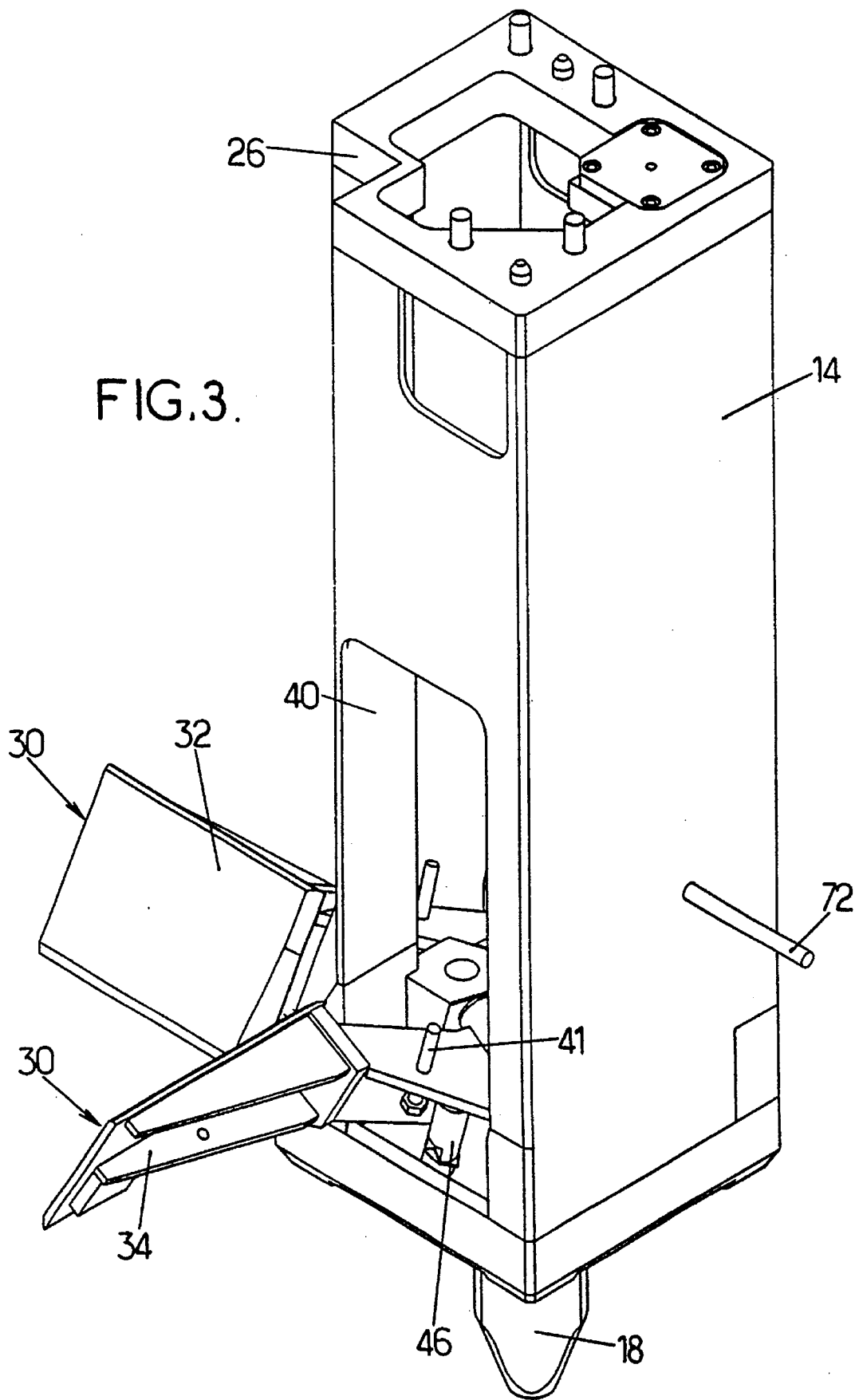

DEVICE FOR GUIDING A FUEL ASSEMBLY DURING LOADING

BACKGROUND OF THE INVENTION

The subject of the present invention is a device for guiding fuel assemblies which is intended to bring it, while it is being loaded, to a location of a lower plate of the core intended to receive it in a nuclear reactor.

Various devices intended to fulfil this function are already known, such as those described in documents JR-A-2,588,689 and FR-A-2,614,128. The guiding device according to the latter document comprises= a body, the horizontal size of which corresponds to that of a fuel assembly, intended to rest on the core plate, equipped with holding means intended to be grasped by an assembly-handling machine, extended downwards by means for positioning it on the lower core plate at an assembly location adjacent to the one intended to receive the assembly to be guided, and two wings carried by the bottom part of the body, forming an angle of 90° in a horizontal plane, each one having an inclined guide face ending at the bottom at the location intended to receive the assembly when the device is installed.

Such a device is placed, with the aid of the mast of the loading machine, at the location diagonally adjacent to the one which is to receive an assembly to be loaded. It makes it possible to bring the base of the assembly to its correct location and facilitates the engagement of the centring holes with which the assembly is equipped in the fingers of the plate which are intended to receive them, even when the assembly has been deformed as a result of earlier irradiation.

In this known device, the wings are fastened rigidly to the body. They make the overall size of the device in plan view very much greater than that of a fuel assembly and as a consequence complicate the handling and storage of the device. What is more, the device cannot be used for guiding an edge assembly into its receiving location.

SUMMARY OF INVENTION

It is a object of invention to provide a guiding device which meets the practical requirements better than those known previously, especially in that it is easier to store: it may especially be placed in a cell for storing a fuel assembly in a pit.

In an advantageous embodiment, each wing is mounted on a pin allowing it to tilt between the deployed and withdrawn positions, through an opening formed in a lateral wall of the body. In general, the pin will be placed so that the weight of the wing tends to bring it into the deployed position. Often this will lead to the pin of each wing being orientated so that it moves progressively away from the face in which the opening is made close to the dihedron enframed by the two wings and so that it slopes downwards, from the inside towards the outside of the body.

As a general rule, the wings will be equipped with means causing them to be withdrawn automatically when the device is lifted up off the lower core plate. For this purpose, the body may contain gear which can be displaced vertically between a bottom position (into which the gear tends to be brought under gravity, owing to its weight, and/or by a spring and in which it keeps each wing in the withdrawn position) and a top position into which it is brought by abutting against elements of the lower core plate (such as the assembly-centring fingers, for example) and allows the wing to tilt, generally under the action of its weight, into the deployed position.

The displacement of each wing may be limited by adjustable limit stops. A bolt may be provided for immobilizing the wings in the retracted position, for example when the device is to be placed in a storage location, in a pit.

The device is advantageously made the same size as the assemblies with which it is intended to interact, so that the device can be handled in the same way as an assembly, during both loading and transfer to the pit. It is also advantageous to give the device the same weight as an assembly.

The invention will be better understood upon reading a particular embodiment given by way of a non-limiting example. The description refers to the accompanying drawings:

BRIEF DESCRIPTION OF THE DRAWINGS

FIG. 1 is an elevation of the whole device, with the wings deployed;

FIG. 2 is a view from beneath of the device of FIG. 1;

FIG. 3 is a perspective view, on a large scale, of the lower part of FIG. 1;

FIG. 4 is a perspective view of the lower part of the device, viewed in a direction 90° from that of FIG. 3;

DETAILED DESCRIPTION OF A PREFERRED EMBODIMENT

Figure 5:
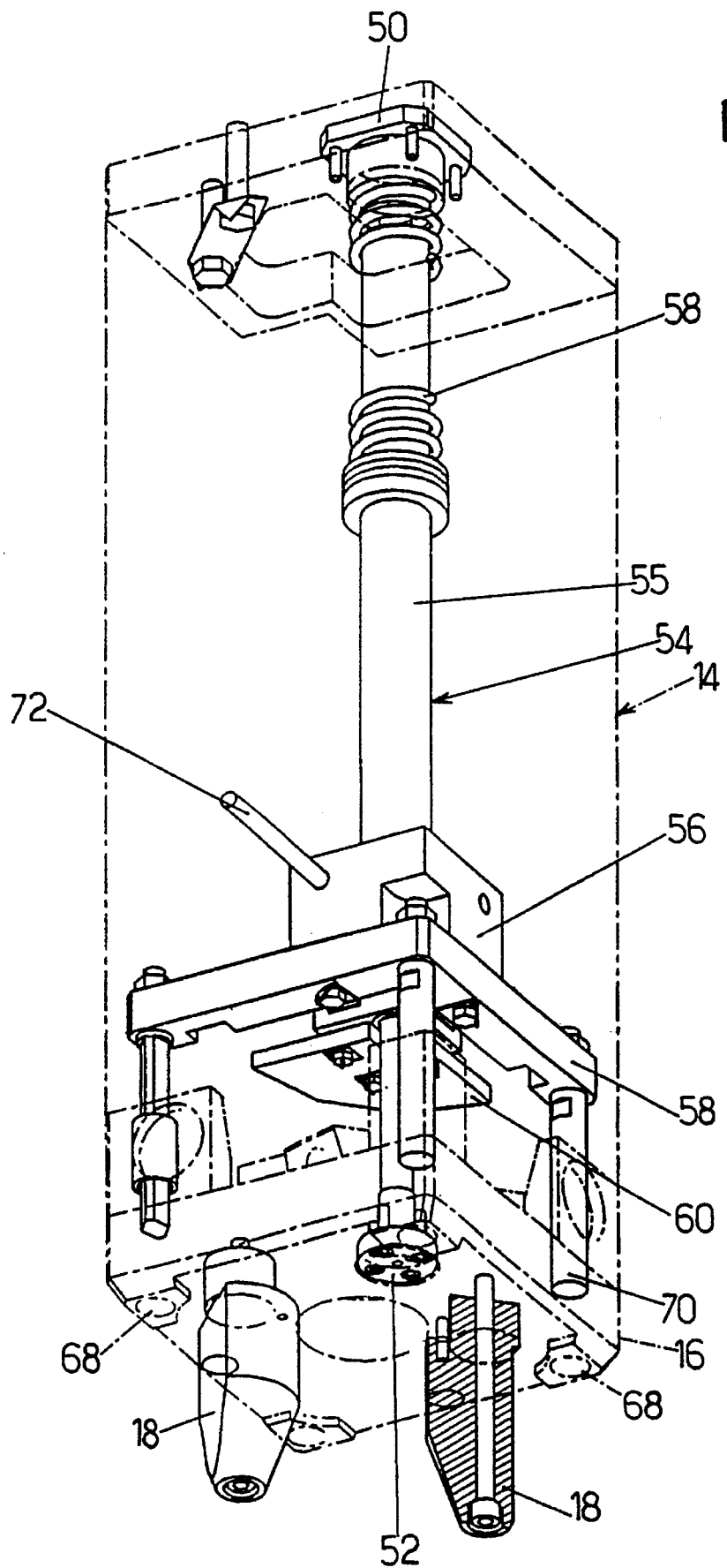
FIG. 5 is an exploded view of the mechanisms placed inside the lower part of the body of the device, in perspective (the outline of the body being represented in chain line)
Figure 6:
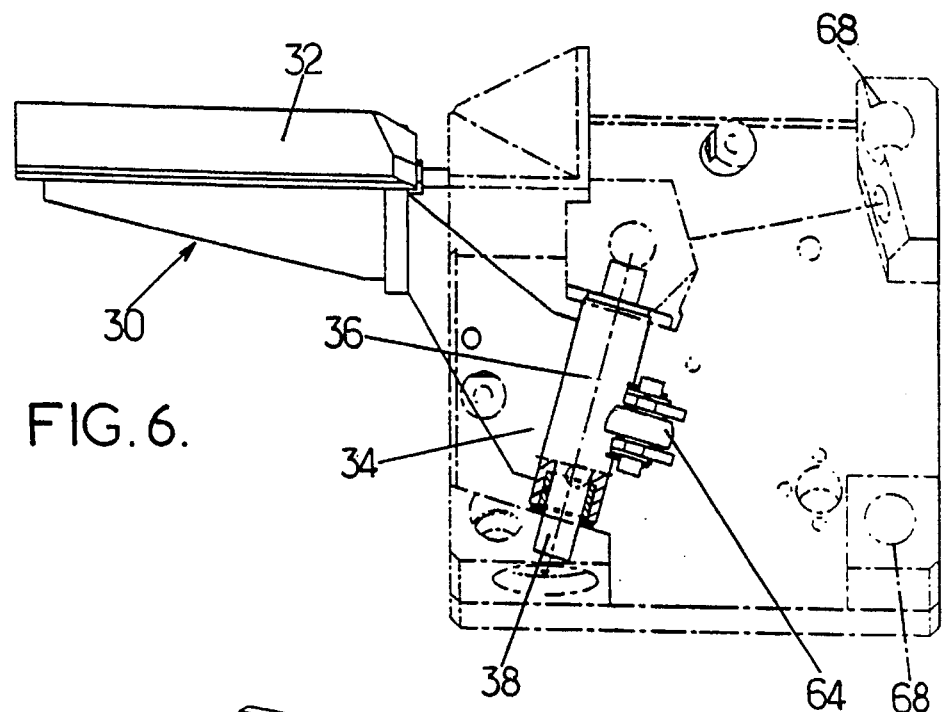
FIG. 6 is a perspective view showing one of the wings in the deployed position, the outline of the body being represented in chain line.

The device shown fully in FIG. 1 has the same overall size as that of a fuel assembly which it is intended to guide, at least when the guide wings are withdrawn. The device includes a composite body which can be regarded as having an upper part 10 equipped with holding means 12 identical to those of a fuel assembly and a lower part 14. This lower part ends in a base 16 equipped with projecting pegs 18 intended to engage in the water holes of the lower core plate 10.

It includes a casing intended to contain the mechanisms which will be described later and a plate for rigid fastening to the upper part.

The upper part 10 is of square section but, in its spanning part, has an indentation 22, the section of which is approximately one quarter of the cross section of the square. This indentation ends at the bottom in an oblique stepped part 24 joining it to an indentation 26, of smaller section, of the lower part 14. This indentation, which constitutes a 90°-reentrant dihedron, has an end stepped part consisting of inclined faces 28.

The arrangement described hitherto is similar to that of the device according to the document FR-A-2,614,128, to which reference may be made.

The device according to the invention includes two wings 30 carried by the bottom part of the body, and able to be deployed into a position in which the wings form an angle of 90° in a horizontal plane each having and constituting an inclined guide face ending at the bottom above the location intended to receive the assembly. The wings can be moved into a retracted position in which they are withdrawn within the horizontal size of the body. The inclined faces of these wings, in the deployed state, are advantageously situated in the continuation of the inclined faces ending the indentation of the body, when the wings are deployed.

Figure 7:
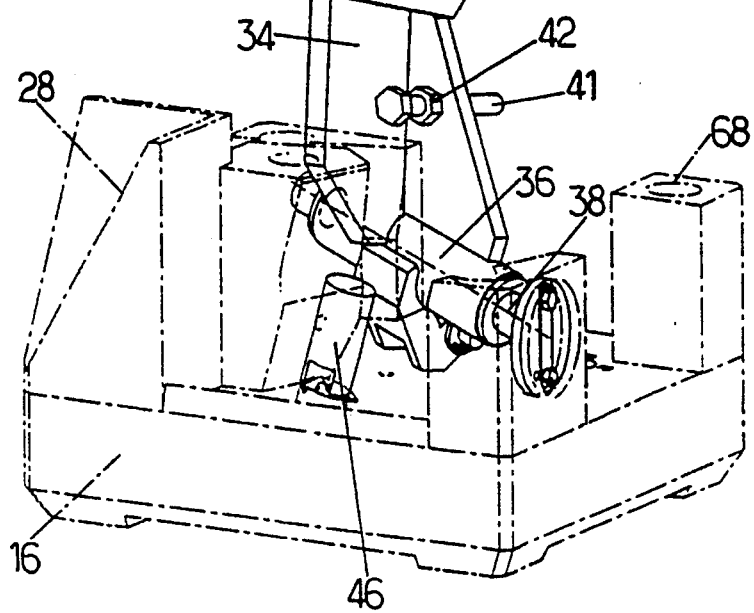
FIG. 7 is a perspective view showing one of the wings in the withdrawn position, the contour of the base of the device being represented in chain line.

The construction and fitting of the wings are apparent especially in FIGS. 3, 4, 6 and 7. Each wing 30 may consist of several parts joined together, for example by welding. In the embodiment illustrated, it can be regarded as having a guide face 32, a connecting arm 34 and a hub 36 which is intended to turn on a pin 38 secured to the base 16. As FIG. 7 shows, the pin 38 is inclined. It moves away from that face of the body in which an opening 40 is made for the passage of the wing as it nears the indentation 26 and the inclined faces 28. It slopes towards the bottom from the inside towards the outside of body. Thus, the weight of each wing tends to tilt it from its retracted position in which it is shown in FIG. 7, into the deployed position.

Limit stops may be provided in order to set the deployed and retracted positions. In the case illustrated in the figures, the retracted position can be set with the aid of an adjustable limit stop, consisting for example of a screw 41 equipped with a stop nut 42 designed to come to bear on a component of the internal mechanisms. A limit stop 46 fastened to the base defines the deployed position of the wing 30. Finally, an additional settable limit stop 47 may be provided on the wing in order to transmit the loads exerted by the assembly being guided by the wing directly to the body. This limit stop comes to bear on the base 16, beside an inclined face 28.

The mechanism intended to cause the forced tilting of the wings into their withdrawn position (FIGS. 4 and 5) includes a top guide pin 50 ending in a base part intended to be pressed into a cell of corresponding shape (not represented) of the upper part 10 and a bottom guide pin 52, coaxial with the pin 50, fixed to the base 16. Gear 54 including a tube 55 on which there bears a spring 58 fitted around the top guide pin and compressed when the upper and lower parts of the body are joined together can slide vertically on the pins 50 and 52. The tube 55 is fastened to a counterweight 56, an angle bracket 62 and a tilting plate 60. The plate 60 is arranged so that it pushes back downwards rollers 64 each carried by a stirrup piece secured to a respective hub 36 when it is brought into the bottom position through action of the spring 58 and of the counterweight 56. The action of the moving gear when unopposed thus brings the wings into the position shown in FIG. 7, in which they are withdrawn inside the body.

The deployment of the wings is brought about, in the embodiment illustrated in the figures, by the device being set down on a lower core plate equipped with centring fingers 66 (FIG. 1). At the locations which receive an assembly, these fingers engage in blind holes formed in the base of the fuel assembly. When the device is put down at an assembly location, it is guided by the engagement of the pegs 18 in the water holes of the plate and the fingers 66 engage in holes 68 passing through the base. At least one of the fingers 66 comes to bear on a vertical rod 70 fastened to the angle bracket 62. The fact of the fingers 66 bearing on the rods 70 pushes the latter and all of the moving gear back upwards relative to the body. The wings 30 therefore deploy under the action of their own weight, each roller 64 following the plate 60 in its displacement.

In contrast, placing the device on a storage surface which does not have fingers does not bring about the deployment of the wings. In order to avoid unintentional deployment of the wings the device may include a spindle 72 for locking the counterweight 56 in the bottom position, immobilizing the wings.

The embodiment which has just been described exhibits numerous advantages. Deployment of the wings takes place only when put in place on a plate including centring fingers. One wing may deploy by itself if the other is held back by a wall, which especially allows the device to be used to assist with the putting in place of an assembly placed at the periphery of the core. However, numerous variant embodiments are possible. For example, the deployment of the wings may be commanded, rather than being brought about by gravity. Mechanisms for folding them back up, independent of one another, may be provided. The folding back into the withdrawn position may be brought about solely by gravity or through the action of a spring. It should be understood that the scope of the present patent extends to these arrangements, and also more generally to any others which remain within the context of equivalents.

We claim:

1. Device for guiding a fuel assembly during loading into a predetermined fuel assembly location on a nuclear reactor lower core plate, comprising:

a body having a transverse cross-section substantially identical to a transverse cross-section of a fuel assembly, suitable to rest on the lower core plate, holding means on said body for being grasped by a fuel assembly handling machine, and indexing means extending downwardly from the body for positioning said body on the lower core plate at an assembly location adjacent to the assembly location intended to receive the fuel assembly to be guided, and two wings carried by a lower part of said body, retractable from a deployed state in which they form an angle of 90° in a horizontal plane into a position in which they are within the transverse cross-section of the body, each said wing having a face which is inclined guide face and has a downward end above the location intended to receive the assembly when the device is in place and said wings are deployed.

2. Device according to claim 1, wherein each of said wing is pivotably mounted on a pin allowing it to move between said deployed position and said withdrawn position through an opening formed in a lateral wall of said body.

3. Device according to claim 2, wherein said pin is arranged so that the wing is based by its weight into the deployed position.

4. Device according to claim 2, wherein a dihedron-shaped indentation is formed in said body at a location which is straddled by the two wings when the latter are in deployed state and wherein each said pin is located on said body in a direction such that it slopes downwards from an inside towards an outside of the body, and converges toward the respective lateral wall from the location of said indentation.

5. Device according to claim 1, further comprising means in said body which are vertically displaceable within the body between:

a bottom position into which they are biased by gravity or by a spring and where they keep said wings in the withdrawn position thereof, and a top position into which they are forced by abutment against the lower core plate and in which they allow the wings to pivot to their deployed position.

6. Device according to claim 5, wherein said means include a unit slidably mounted on at least one vertical rod fixed to said body and arranged to bear a pair of rollers each carried by a respective one of said wings, and vertical rods projecting from said unit for abutment against centering fingers belonging to the lower core plate when the device is set down on the lower core plate.

7. Device according to claim 1, further comprising adjustable stop means for limiting the displacement of each of said wings.

8. Device according to claim 1, further comprising spindle means slidably received in the body for retaining the wings in the retracted position thereof, when located in a predetermined position.

9. Device according to claim 1, wherein said body is formed with an indentation constituting a 90°-reentrant dihedron, located between the two wings, and having a shoulder part in a region of the wings, said shoulder having inclined faces which are so located as to constitute an extension of the guide faces of the wings when the latter are in the deployed position.

10. Device according to claim 9, wherein said body comprises an upper part and a lower part, both of square cross section, fixed to one another, and wherein the indentation has a cross-section in the upper part representing approximately one quarter of the square cross-section and ends downwardly as sloped surfaces merging with a smaller cross-section of the indentation in the lower part.

* * * * *